United States Patent
Buhr

(10) Patent No.: US 6,735,697 B1
(45) Date of Patent: May 11, 2004

(54) CIRCUIT ARRANGEMENT FOR ELECTRONIC DATA PROCESSING

(75) Inventor: Wolfgang Buhr, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/483,920

(22) Filed: Jan. 18, 2000

(30) Foreign Application Priority Data

Jan. 19, 1999 (DE) .......................................... 199 01 829

(51) Int. Cl.⁷ ................................................ G06F 11/30
(52) U.S. Cl. ......................................... 713/190; 380/44
(58) Field of Search ............................. 713/190; 380/44

(56) References Cited

U.S. PATENT DOCUMENTS

| | | | | |
|---|---|---|---|---|
| 5,787,171 A | * | 7/1998 | Kubota et al. ................. | 380/20 |
| 6,122,716 A | * | 9/2000 | Combs ........................ | 711/163 |
| 6,408,073 B1 | * | 6/2002 | Hsu et al. ..................... | 380/20 |
| 2001/0039617 A1 | * | 11/2001 | Buhrlen et al. ............. | 713/185 |

OTHER PUBLICATIONS

Japanese Abstact: JP08320832A, Application No. 07150900, Published Dec. 3, 1996, Intl.CL. G06F.

* cited by examiner

Primary Examiner—Albert Decady
Assistant Examiner—Odaiche T Akpati
(74) Attorney, Agent, or Firm—Kevin Simons

(57) ABSTRACT

A description is given of a circuit arrangement for electronic data processing which includes a writeable memory for storing data to be protected against unauthorized access, a read-only memory for storing individualizing data, a control unit for generating given control signals in dependence on a reset signal sequence to be executed by the control unit during operation of the circuit arrangement, a scrambling pattern generator for generating scrambling pattern signals by combining at least a part of the individualizing data from the read-only memory with the control signals during the execution of the reset signal sequence and for subsequently outputting these scrambling pattern signals until the execution of a next reset sequence, and a scrambling logic unit for the scrambling of address and/or data signals of the data to be stored in the writeable memory in conformity with the scrambling pattern signals supplied by the scrambling pattern generator upon storage of this data, and for the corresponding descrambling of the data signals upon reading out from the erasable memory.

This circuit arrangement offers increased protection against unauthorized access.

7 Claims, 2 Drawing Sheets

CIRCUIT ARRANGEMENT FOR ELECTRONIC DATA PROCESSING

BACKGROUND OF THE INVENTION

The invention relates to a circuit arrangement for electronic data processing.

The abstract in English of the document JP-A-08320832 describes a non-volatile semiconductor memory with a secrecy function, for example an EPROM, an EEPROM, a mask-programmed ROM or a so-called flash memory which utilizes a microcomputer. Such a non-volatile semiconductor memory includes a scrambling unit which modifies and outputs input information if data read from a selected element of the non-volatile memory matches entered key code information. The memory includes a storage field which consists of a plurality of non-volatile storage elements which are arranged in the form of a matrix. A user writes key code information into a non-volatile storage unit and an element of a volatile memory is selected. A comparator compares the data read from the selected storage element and the key code information and outputs the comparison results. A scrambling unit outputs the input information in non-modified form if the compared data do not correspond whereas it modifies and outputs the input information if the compared data corresponds. The aim is to enable the user to select a memory address independently. The secrecy of stored information should be improved, thus enhancing the reliability. The number of persons knowing secret key code information should thus be reduced. Moreover, the control should be simplified and the costs reduced.

SUMMARY OF THE INVENTION

It is an object of the invention to provide a circuit arrangement for electronic data processing which offers increased protection against unauthorized access.

This object is achieved by a circuit arrangement for electronic data processing according to the invention which includes

- a writeable memory for storing data to be protected against unauthorized access,
- a read-only memory for storing individualizing data,
- a control unit for generating given control signals in dependence on a reset signal sequence to be executed by the control unit during operation of the circuit arrangement,
- a scrambling pattern generator for generating scrambling pattern signals by combining at least a part of the individualizing data from the read-only memory with the control signals during the execution of the reset signal sequence and for subsequently outputting these scrambling pattern signals until the execution of a next reset signal sequence,
- and a scrambling logic unit for the scrambling of address and/or data signals of the data to be stored in the writeable memory in conformity with the scrambling pattern signals supplied by the scrambling pattern generator upon storage of this data, and for the corresponding descrambling of the data signals upon reading out from the erasable memory.

Memories which are used in circuit arrangements for electronic data processing and are writeable notably in the context of the operation of such a circuit arrangement customarily have a regular structure so that address and/or data signals can be entered in conformity with a given, clearly organized scheme and data signals can also be derived in such a manner from such a memory. For applications where the secrecy of such data is of utmost importance, however, such a regular structure constitutes a drawback, because it can be comparatively simply found out by non-authorized access. Therefore, in the case of security-relevant applications, for example in the field of identification, data to be protected against discovery cannot be sufficiently reliably stored in such a memory.

It could be attempted to satisfy the described security requirements by scrambling addresses and data in the writeable memory in conformity with a fixed but as secret as possible scheme. The structure of the addresses and data is thus obscured, but if a large number of similar circuit arrangements were manufactured, the scrambling chosen would be the same in all circuit arrangements. In that case it would be possible to discover such scrambling on the basis of one specimen of said circuit arrangement and such knowledge of the scrambling scheme of this one circuit arrangement could be used to gain unauthorized access or at least facilitate access to all other circuit arrangements of the same kind.

In order to eliminate such a risk also, according to the invention the scrambling pattern used is made dependent on individualized data stored in the read-only memory. This data is selected so as to be different for each individual specimen of the circuit arrangement according to the invention, thus enabling identification of a specific, individual specimen of the circuit arrangement according to the invention. A scrambling pattern thus influenced for the address and/or data signals for the writeable memory ensures that an individual, non-recurrent scrambling pattern is indeed used for each individual specimen of the circuit arrangement according to the invention. As a result, even after discovery of the scrambling pattern of one specimen of the circuit arrangement according to the invention, it will be impossible to apply such knowledge to gain access to the protected data in the writeable memory of an arbitrary other specimen of the circuit arrangement according to the invention.

In conformity with the second step according to the invention, taken in combination with the previously described first step, the scrambling utilizes control signals which are generated by a control unit in the circuit arrangement if a predetermined reset signal sequence is to be executed during its operation. In the scrambling pattern generator the control signals generated during such a reset signal sequence (also referred to as reset sequence) are combined with the individualizing data from the read-only memory, with a part of such data or with a combination of at least a part of such individualizing data and other data, so that the scrambling pattern generated according to the invention (represented by the scrambling pattern signals) has been influenced by the individualizing data as well as by the control signals. The effect of the control signals is such that in the case of unauthorized access, causing a disturbance of the control signals, a false scrambling pattern would be generated; the use of such a false scrambling pattern would render data derived from the writeable memory useless. It can thus be prevented that in the case of unauthorized access, also referred to as a security attack, the security mechanisms of the circuit arrangement according to the invention, intended to protect the stored data, are circumvented by external influencing of given control signals, and notably that data to be protected is read from the writeable memory and hence discovered.

The circuit arrangement according to the invention can be used particularly for identification devices, notably chip cards, electronic labels, electronic access keys and the like. Not only customary data such as, for example account balances or the like, can thus be safely stored in the writeable memory; in a preferred application an EEPROM is provided as the writeable memory in which complete application programs can be stored as the data to be protected. This enables, for example a chip card provided with such a circuit arrangement to be prepared for different applications, if desired without modification of the structure. Depending on the data or programs stored in the writeable memory, such a chip card can then serve, as desired, as a credit card, an access key, purchasing identification or the like and, for example, for its function as credit card applications can be programmed as desired for different credit institutes in different locations. A combination of such specific applications, that is to say a combination individually composed for the relevant user, is also feasible. The read-only memory then provides the storage of the data individually related to the individual user. The read-only memory is preferably constructed as a programmable ROM.

In order to enable the processing of the data derived from the writeable memory and scrambled according to the invention, for example, in an arithmetic unit which is preferably of an identical construction for all specimens of the circuit arrangement according to the invention, the individually scrambled data must be reconverted into a uniform data format again upon reading out from the writeable memory, i.e. the scrambling must be suitably canceled. This operation will be referred to as "descrambling" hereinafter.

The scrambling logic unit of the circuit arrangement according to the invention preferably includes a permutation stage for the permutation of bits of different value in the address and/or data signals applied to the scrambling logic unit, and also an inverter stage for inverting the values of the bits of the address and/or data signals. Thus, permutation as well as inversion of the data and/or the addresses in the writeable memory can be performed as scrambling operations. Thus, the spatial assignment of individual storage cells of the writeable memory is irregularly scrambled and the meaning of the values stored in such storage cells is obscured by irregular inversion. The permutation stage and the inverter stage are both controlled by the scrambling pattern signals.

In a further embodiment of the invention such control can be performed by control signals which are derived from the scrambling pattern signals in a decoding stage. The decoding stage preferably forms part of the scrambling logic unit.

The scrambling pattern generator in a further embodiment of the circuit arrangement according to the invention includes a clocked, retrocoupled shift register arrangement. During the reset signal sequence the shift register arrangement is supplied with the control signals and/or with at least a part of the individualizing data from the read-only memory and/or with a signal pattern derived therefrom by logic combination. On the basis of this signal pattern the shift register arrangement generates the scrambling pattern signals and stores these signals for subsequent supply to the scrambling logic unit.

BRIEF DESCRIPTION OF THE DRAWINGS

The drawing shows an embodiment of the circuit arrangement according to the invention which will be described in detail hereinafter.

DETAILED DESCRIPTION

Figure 1:
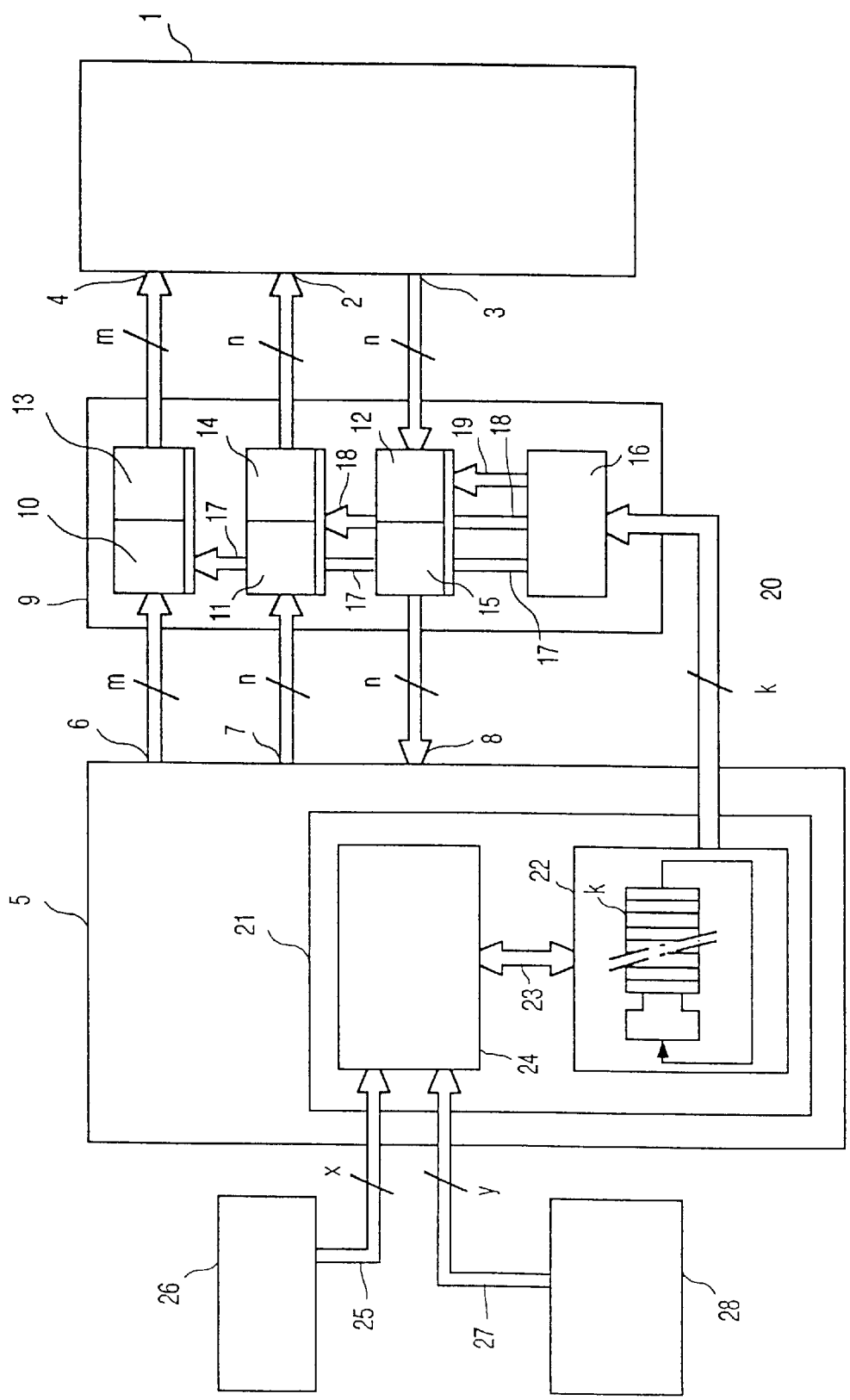
FIG. 1 shows a block diagram of the embodiment according to the invention.

The circuit arrangement shown in FIG. 1, preferably intended for use in a chip card, includes a writeable memory which is denoted by the reference numeral 1 and is constructed as an EEPROM in the present embodiment. Application-specific data or programs are to be stored in the writeable memory 1 so as to be protected against unauthorized access. This data is entered in the form of n parallel data signals via a data input 2 with n parallel bit leads. Analogously, n parallel data signals can be read out from the writeable memory 1 via a data output 3 with n parallel bit leads. In order to address the memory cells of the writeable memory 1, m parallel address signals are applied thereto via an address input 4 with m parallel bit leads. The numbers of n and m bit leads may be chosen so as to be different, depending on the most attractive data format for the relevant application of the circuit arrangement according to the invention.

The address and data signals between the writeable memory 1 and a memory interface circuit 5, being an EEPROM interface in the present embodiment. To this end, the memory interface circuit 5 includes an address output 6 with m parallel bit leads for m parallel address signals as well as a data output 7 and a data input 8, each of which has n parallel bit leads for n parallel data signals. The address and data signals between the writeable memory 1 and the memory interface circuit 5 are transported via a scrambling logic unit 9. The scrambling logic unit 9 includes a permutation stage which consists of three sections, denoted by the reference numerals 10, 11 and 12, and also includes an inverter stage which also consists of three sections, i.e. 13, 14 and 15. The address output 6 of the memory interface circuit 5 is connected to the address input 4 of the writeable memory via the first section 10 of the permutation stage and the first section 13 of the inverter stage. The data output 7 of the memory interface circuit 5 is connected to the data input 2 of the writeable memory 1 via the second section 11 of the permutation stage and the second section 14 of the inverter stage. The data output 3 of the writeable memory 1 is connected to the data input 8 of the memory interface circuit 5 via the third section 12 of the permutation stage and the third section 15 of the inverter stage. The block diagram of FIG. 1 shows the first and second sections 10, 13 and 11, 14 of the permutation stage and the inverter stage, respectively, in the scrambling logic unit 9 so as to be separate, so that separate scrambling of the address signals and data signals is performed. However, the first and the second section 10, 11 of the permutation stage and also the first and the second section 13, 14 of the inverter stage can also be combined in such a manner that address and data signals can also be scrambled together.

The scrambling logic unit 9 also includes a decoding stage 16 which outputs, via control leads 17, 18 and 19, control signals for controlling the permutation stage 10, 11, 12 and the inverter stage 13, 14, 15. Control signals for controlling the combination of the first section 10 of the permutation stage and the first section 13 of the inverter stage are routed via the first control lead 17. Analogously, the second control lead 18 serves for the control signals for the combination formed by the second section 11 of the permutation stage and the second section 14 of the inverter stage. The control signals for controlling the combination formed by the third section 12 of the permutation stage and the third section 15 of the inverter stage are routed via the third control lead 19.

In the decoder stage 16 the control signals are derived from scrambling pattern signals which are supplied by the memory interface circuit 5 via a scrambling pattern signal lead 20. The circuit arrangement shown in FIG. 1 involves a number of k parallel scrambling pattern signals, said number k being selectable independently of the numbers n and m of data and address signals. Analogously, the scrambling pattern signal lead 20 includes k parallel bit leads.

The scrambling pattern signals are generated in a scrambling pattern generator 21 which is included in the memory interface circuit 5. In the block diagram of the embodiment shown in FIG. 1 the scrambling pattern generator 21 includes a clocked, retrocoupled shift register arrangement 22 and a combination circuit 24 which is connected thereto via a data exchange lead 23. The combination circuit 24 itself is connected, via a data link 25 with x parallel bit leads, to a read-only memory 26 and, via a further data link 27 with y parallel bit leads, to a control unit 28. The read-only memory, i.e. a ROM or also a programmable read-only memory (PROM), preferably contains data relating to the user of the circuit arrangement according to the invention, so data having individual values for every specimen of the circuit arrangement. The data structure in the read-only memory 26 may also be individually different. Such individualizing data, or a part thereof, possibly together with further data stored in the read-only memory, is applied to the combination circuit 24 via the data link 25. Control signals are applied from the control unit 28 to the combination circuit 24 via the data link 27. These control signals are formed in the control unit 28 in dependence on a reset signal sequence or "RESET" sequence to be executed by the control unit 28 during operation of the circuit arrangement, and are also output during this reset signal sequence, for example via the data link 27. In the combination circuit 24 the data supplied by the read-only memory 26, via the data link 25, is first logically combined with the control signals. The word widths, i.e. the numbers x and y of parallel bit leads of the data links 25 and 27, can again be selected independently of one another and independently of the numbers of bit leads of the described links.

The result of the logic combination of the data from the read-only memory 26 and the control signals as performed in the combination circuit 24 is applied, via the data exchange lead 23, to the clocked, retrocoupled shift register arrangement 22 and controls the generating and storage of the scrambling pattern signals therein. To this end, retrocoupling of data from the shift register arrangement 22 to the combination circuit 24 may also be realized via the data exchange lead 23. Preferably, the shift register arrangement 22 includes a number of k register cells which corresponds to the number of k parallel bit leads of the scrambling pattern signal lead 20, i.e. in each of the k register cells of the shift register arrangement 22 one of k newly formed scrambling pattern signals is stored after execution of the reset signal sequence. Said scrambling pattern signals are applied to the decoding stage 16 of the scrambling logic unit 9 via the scrambling pattern signal lead 20.

Depending on the specific construction of the control unit 28, it may be arranged that the same control signals occur again after each correctly executed reset signal sequence, so that scrambling pattern signals with the same values are formed again, together with the non-modified data from the read memory 26, in the case of appropriate, i.e. authorized use of the circuit arrangement according to the invention. This is advantageous when the content of the writeable memory 1 should still be usable by the authorized user also after a correctly executed reset signal sequence. A reset signal sequence which has not been correctly executed, for example due to an unauthorized attempted access, then modifies the control signals and hence the scrambling pattern signals. The descrambling of the data stored in the writeable memory 1 cannot be correctly performed in that case; only non-readable data is then applied to the memory interface circuit 5 via the respective third parts 12 and 15 of the permutation stage and the inverter stage.

The control unit 28 in a further embodiment, however, may also be constructed in such a manner that said reset signal sequence is triggered only in the case of an unauthorized attempt to gain access or in the case of authorized, completely new storage of data in the writeable memory 1, and that the scrambling pattern signals formed therefrom are stored and remain unmodified until the appearance of the next reset signal sequence, and that a random function is taken up in the formation of the scrambling pattern signals in the scrambling pattern generator 21 or possibly in the control unit 28 so that each reset signal sequence produces new, non-reproducible scrambling pattern signals. In that case subsequently storage of data takes place in the writeable memory 1, again via the first and second sections 10, 11 and 13, 14 of the permutation stage and the inverter stage, respectively, as in the embodiments described thus far, in conformity with a new scrambling pattern. Consequently, the descrambling, again via the third sections 12 and 15 of the permutation stage and the inverter stage, respectively, as in the previously described embodiments, of the data from the writeable memory 1 in conformity with a protocol adapted to the valid scrambling pattern is possible only until the appearance of the next reset signal sequence. The accessing of the data from the writeable memory 1 is thus blocked by a reset signal sequence.

The invention thus enables the generation of a variable but reproducible scrambling pattern in various embodiments. The invention can be readily adapted to different modes of operation and types of application.

Figure 2:
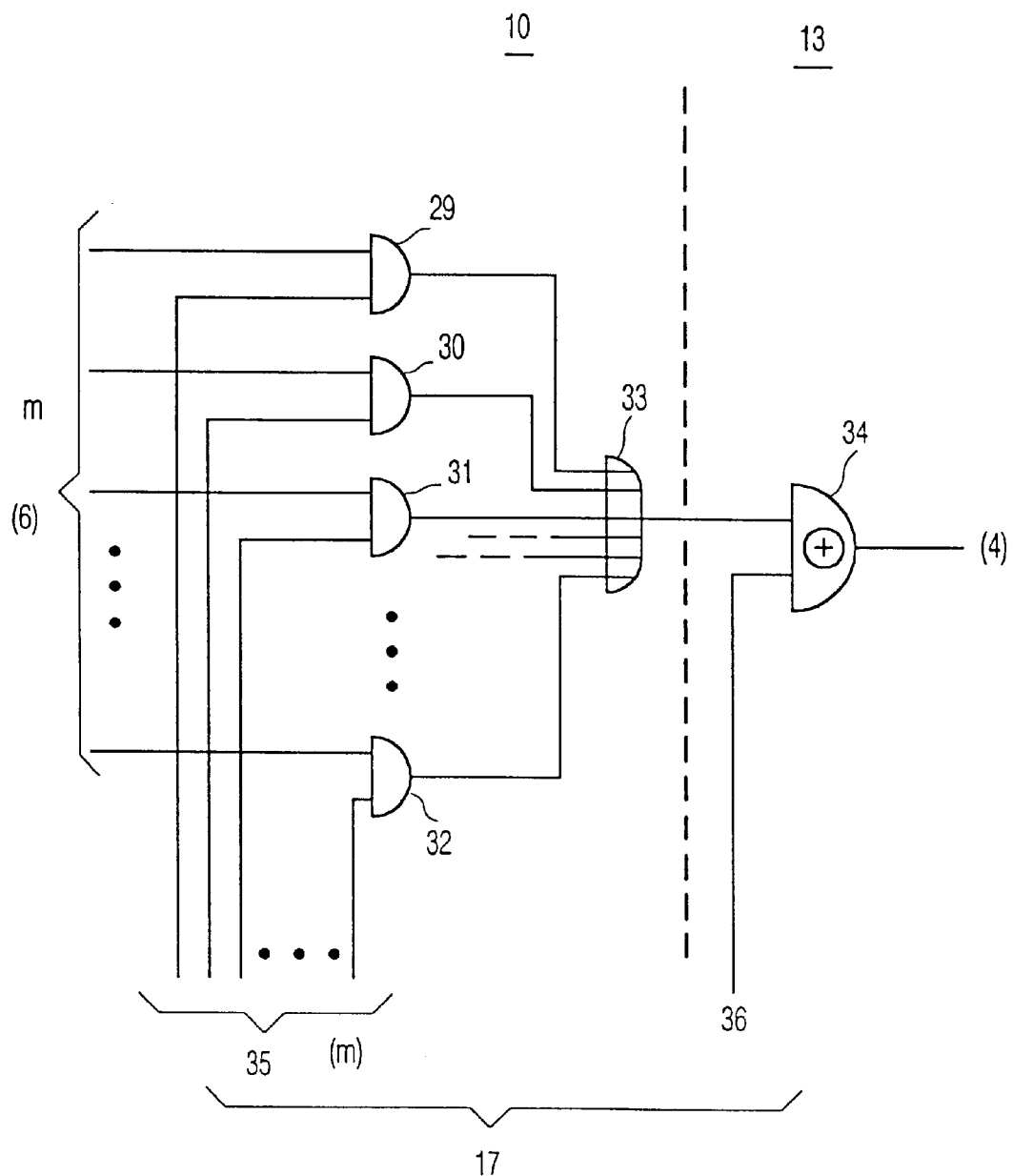
FIG. 2 shows a logic diagram of a part of the circuit arrangement shown in FIG.

On the basis of the examples of the respective first sections 10 and 13, FIG. 2 shows diagrammatically the structure of the permutation stage and the inverter stage; for the sake of clarity only the required logic gates are shown in the form of a block diagram, said gates being connected to one of the m bit leads which are connected to the address input 4 of the writeable memory 1. The sections 11, 12 and 14, 15 of the permutation stage and the inverter stage for the scrambling of the data signals, however, have an analogous construction. FIG. 2 shows an alternative construction in which the address signals on the m parallel bit leads from the address output 6 are scrambled only among themselves but not with the data signals from the data output 7. Such an alternative version of the arrangement of FIG. 2, however, will be evident.

In FIG. 2 each of the m parallel bit leads is routed from the address output 6 (reference numerals between parentheses) to a first input of a respective AND-gate 29, 30, 31 and 32. Every second input of these AND-gates 29 to 32 is connected to a respective one of m selection leads 35 which form part of the first control lead 17. Via the selection leads 35 each time only one of the AND-gates 29 to 32 is selected, so that an address signal appears exclusively on the output of one of the AND-gates 29 to 32. This address signal is applied, via an OR-gate 33 which collects the outputs of all AND-gates 29 to 32 on one bit lead, to a first input of an EXCLUSIVE-OR-gate 34. Whereas the AND-gates 29 to 32 and the OR-gate 33 are included in the first section 10 of the permutation stage, the EXCLUSIVE-OR-gate 34 is included in the first section 13 of the inverter stage. A second input of the EXCLUSIVE-OR-gate 34 is connected to an inverter control lead 36 which also forms part of the first control lead 17. An output of the EXCLUSIVE-OR-gate 34 is connected to a bit lead of the address input 4 of the writeable memory 1. Under the control of the control signals on the first control lead 17, the selected address signal is conducted in inverted or non-inverted form by the EXCLUSIVE-OR-gate 34, depending on the scrambling pattern signals. Appropriate structuring of the control signals on the control lead 17 ensures that the desired scrambling of the address signals occurs, i.e. that each of the address signals appears again on exactly one of the bit leads of the address inputs 4 of the writeable memory 1.

The described structure of the scrambling logic unit also enables complex scrambling patterns, if necessary, to be simply implemented. The assignment of individual data words to the storage elements of the writeable memory 1, the arrangement of the individual bits in the relevant data word, and the values of these bits can thus be scrambled very simply. Moreover, a similar, common scrambling of address and data signals can also be achieved. The scrambling logic unit shown also offers the advantage that it induces only a very small prolongation of the signal transit times from the memory interface circuit 5 to the writeable memory 1 and back. The scrambling logic unit shown in FIG. 2 thus induces a delay amounting to only the sum of the signal transit times in an OR-gate 29, 30, 31 or 32, the OR-gate 33 and the EXCLUSIVE-OR-gate 34.

What is claimed is:

1. A circuit arrangement for electronic data processing comprising:
    a writeable memory for storing data to be protected against unauthorized access,
    a read-only memory for storing individualizing data,
    a control unit for generating given control signals in dependence on a reset signal sequence to be executed by the control unit during operation of the circuit arrangement,
    a scrambling pattern generator for generating scrambling pattern signals by combining at least a part of the individualizing data from the read-only memory with the control signals during the execution of the reset signal sequence and for subsequently outputting these scrambling pattern signals until the execution of a next reset signal sequence,
    and a scrambling logic unit for the scrambling of address and/or data signals of the data to be stored in the writeable memory in conformity with the scrambling pattern signals supplied by the scrambling pattern generator upon storage of this data, and for the corresponding descrambling of the data signals upon reading out from the erasable memory.

2. A circuit arrangement as claimed in claim 1, wherein the scrambling logic unit comprises:
    a permutation stage for the permutation of bits of different value in the address and/or data signals applied to the scrambling logic unit, and
    an inverter stage for inverting the values of the bits of the address and/or data signals,
    the permutation stage and the inverter stage being controlled by the scrambling pattern signals.

3. A circuit arrangement as claimed in claim 2, characterized in that the scrambling logic unit includes a decoding stage for extracting control signals for the permutation stage and the inverter stage from the scrambling pattern signals.

4. A circuit arrangement as claimed in claim 1, characterized in that the scrambling pattern generator includes a clocked, retrocoupled shift register arrangement which, during the reset signal sequence, is supplied with the control signals and/or with at least a part of the individualizing data from the read-only memory and/or with a signal pattern derived therefrom by logic combination, and generates the scrambling pattern signals therefrom and stores these signals for subsequent supply to the scrambling logic unit.

5. A chip card including a circuit arrangement, the circuit arrangement comprising:
    a writeable memory having data to be protected against unauthorized access stored therein;
    a read only memory having individualizing data stored therein;
    a scrambling pattern generator coupled to the read only memory;
    a control unit coupled to the scrambling pattern generator; and
    a scrambling logic unit coupled to the scrambling pattern generator, and to the writeable memory;
    wherein the scrambling pattern generator comprises a retrocoupled shift register; and wherein the scrambling logic unit comprises an address scrambler, and an address inverter coupled to the address line scrambler; a write data scrambler, and a write data inverter coupled to the write data scrambler; and a read data descrambler, and a read data inverter coupled to the read data descrambler.

6. The chip card of claim 5, further comprising a memory interface coupled to the scrambling logic unit, wherein the memory interface is configured to provide addresses and data to the scrambling logic unit, and is further configured to receive data from the scrambling logic unit.

7. The chip card of claim 6, wherein the scrambling pattern generator is configured to provide control signals to the scrambling logic unit based, at least in part, upon the individualizing data.

* * * * *